Jan. 15, 1952 H. G. WEIGHTMAN Re. 23,454

RESONANT MAGNETIC SWITCH ASSEMBLY

Original Filed Aug. 14, 1946

INVENTOR.
HERBERT G. WEIGHTMAN
BY Robert T. Palmer
Attorney

Reissued Jan. 15, 1952 Re. 23,454

UNITED STATES PATENT OFFICE 23,454

RESONANT MAGNETIC SWITCH ASSEMBLY

Herbert G. Weightman, Berkeley, Calif., assignor to Stevens-Arnold Inc., Boston, Mass., a corporation of Massachusetts Original No. 2,471,594, dated May 31, 1949, Serial No. 690,387, August 14, 1946. Application for reissue May 17, 1950, Serial No. 162,596

4 Claims. (Cl. 200—91)

Matter enclosed in heavy brackets [ ] appears in the original patent but forms no part of this reissue specification; matter printed in italics indicates the additions made by reissue.

This invention relates to electric switches having resonant armatures which close electric circuits when alternating currents having the frequencies to which their armatures are resonant, are supplied through their energizing coils, and which are known generally, as resonant switches.

Prior resonant switches for performing the duties for which this invention was devised, utilized pairs of resonant armatures supported as cantilever beams from the opposite sides of sealed glass envelopes. Such switches were not only costly but their desired resonant frequencies, in mass produced switches, were difficult to maintain.

This invention provides a resonant switch which utilizes but a single resonant armature for each frequency to which the switch is responsive, and which is less expensive and more efficient than the prior switches.

Objects of the invention are to improve the performance of, and to reduce the cost of, resonant switches.

The invention will now be described with reference to the drawing, of which:

Figure 1:
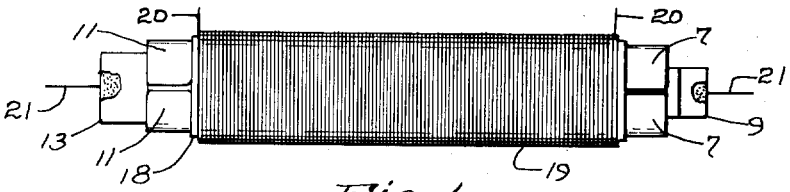
Fig. 1 is a plan view looking downwardly upon an assembled switch embodying this invention.
Figure 2:
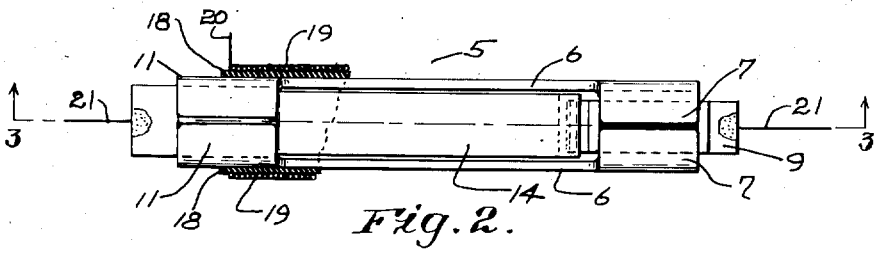
Fig. 2 is a plan view similar to Fig. 1 but with a portion of the energizing coil removed.
Figure 3:
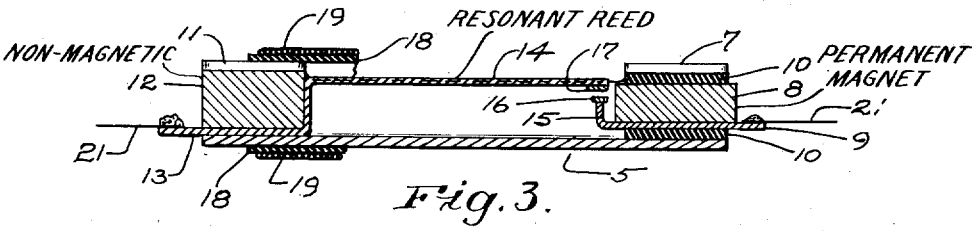
Fig. 3 is a sectional view along the lines 3—3 of Fig. 2.

Referring first to Figs. 1, 2 and 3, the metal channel member 5 has the perpendicular extensions 6 with the turned over ears 7 at one end, which extend over and support in position, the permanent magnet 8 against the contact member 9 of magnetizable metal, and the wrapper 10 of electric insulation around the magnet and the contact member. The extensions 6 of the channel member 5 have the turned over ears 11 at their other end, and which extend over and support in position, the brass filler block 12 against the fixed end 13 of the armature 14 of magnetizable spring metal.

The contact member 9 has a perpendicular extension 15 with the contact surface 16 thereon adjacent and normally spaced from the contact surface 17 on the adjacent side of the free end of the armature 14 which is seen to be supported as a cantilever beam.

The coil form 18 is supported on the channel member 5 around the armature 14, and has wound thereon the energizing coil 19 which is adapted to be connected by the wires 20 to a source of alternating current.

The fixed end 13 of the armature 14, and the outer end of the contact member 9 are adapted to be connected to an electric circuit for closing same when the contact surface 17 of the armature 14 strikes the contact surface 16 of the contact member 9.

The armature 14 is resonant at a selected frequency which, by way of example, may be 100 cycles per second, and when alternating current of that frequency is passed through the coil 19, the deflection of the armature will be sufficient to cause the contact surface 17 to strike the contact surface 16.

The armature 14 is magnetized by the current flowing through the coil 19 whereby the free end of the armature will alternately be attracted to and released by, the inner end of the contact member 9. The magnet 8 initially magnetizes the contact member 9 whereby the free end of the armature is attracted thereby when no current is flowing through the energizing coil, thus biasing the free end of the armature towards the contact member. The coil magnetizes the armature to the opposite polarity during the half-cycles the magnetic field of the coil opposes that of the magnet whereby the armature is repelled by the contact member. During the other half-cycles, the magnetic fields of the coil and of the magnet are in aiding relation providing increased attraction between the free end of the armature and the contact member. This provides greater armature movement and more positive contact.

Another function of the magnet 8 is to adjust precisely the resonant frequency of the armature 14. The magnet attracts the free end of the armature and opposes its freedom to vibrate thereby adding effective stiffness to the armature.

Due to inequalities in material, two similar armatures may have different resonant frequencies. But by slidably positioning the magnet 8 towards or away from the free end of the armature during the assembly of the switch, the effective stiffness and therefore the resonant frequency of each armature can accurately be adjusted to that desired.

Figure 4:
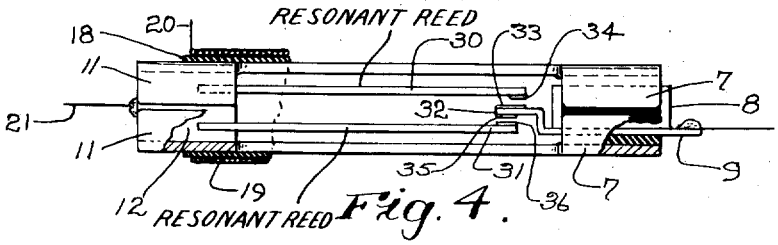
Fig. 4 is a plan view with a portion of the energizing coil removed, of another switch embodying this invention, and having two armatures resonant at different frequencies.

The resonant switch illustrated by Fig. 4 is similar to that described in connection with Figs. 1–3 except that two armatures 30 and 31 have corresponding ends anchored in the brass filler block 12 in the channel member 5; the contact member 9 has its inner end 32 extending between the free ends of the armatures 30 and 31 with its contact surface 33 spaced from the contact surface 34 of the armature 30, and with its contact surface 35 spaced from the contact surface 36 of the armature 31; the planes of the armatures and the contact member are perpendicular in the channel member to those of Figs. 1–3, and one of the wires 21 is connected to the brass block 12 instead of to the fixed end of one of the armatures.

The wires 21 are adapted to connect both armatures 30 and 31, and the contact member 9 of Fig. 4 to an electric circuit to be closed. The armature 30 is seen to be longer than the armature 31 whereby it is resonant at a lower frequency. Thus the electric circuit to which the wires 21 of Fig. 4 are connected, will be closed when current having the frequency to which the armature 30 is resonant, is passed through the coil 19, and when current having the frequency to which the armature 31 is resonant, is passed through the coil. Or if the resonance curves of the two overlap, the circuit to be closed by the switch, will be closed at any frequency in the band of frequencies covered by the overlapping resonance curves.

An advantage of the embodiment of Fig. 4, in addition to providing two resonant armatures in one switch, is that the two armatures are magnetized alike by their energizing coil resulting in their free ends having the same magnetic poles and thereby repelling each other thus biasing them away from the contact member and providing greater armature movement.

Another advantage of the switch of Fig. 4 is that since the magnetic member 9 to which they are attracted and by which they are repelled when alternating current is supplied to their energizing coil, is between the two armatures, their movements are 180° out of phase, and the vibrations of the switch caused by the motion of one armature are reduced by the oppositely phased motion of the other armature whereby the mass of the block 12, and of the switch can be substantially reduced. This advantage is so great that it is preferred that even where the switch is intended to be resonant at only one frequency, the two armatures 30 and 31 be used with the contact surface being omitted from one. In such a case both armatures preferably would be resonant at substantially the same frequency.

While embodiments of the invention have been described for the purpose of illustration, it should be understood that the invention is not limited to the exact apparatus and arrangement of apparatus illustrated, as modifications thereof may be suggested by those skilled in the art without departure from the essence of the invention.

What is claimed is:

1. A resonant switch comprising a channel member having a base, and sides extending substantially perpendicular to said base; an armature of magnetizable spring metal; means including a filler block for supporting said armature as a cantilever beam in one end of said channel member; a contact member of magnetizable metal in the other end of said channel member and having its inner end overlapping and spaced from the free end of said armature; a permanent magnet alongside said contact member and having its inner end closely spaced from said free end of said armature; insulation around said contact member and said magnet for insulating same from said channel member; extensions on said sides of said channel member bent over at one end thereof for supporting said filler block and said armature in said channel member; other extensions on said sides bent over at the other end thereof for supporting said insulation, said magnet and said contact member in said channel member, and an energizing coil supported around said channel member for magnetizing said armature, said free end of said armature being adapted to strike said contact member and to close an electric circuit connected thereto and to said armature when alternating current having the resonant frequency of said armature is passed through said coil.

2. A resonant switch comprising a channel member having a base, and sides extending substantially perpendicular thereto; an armature of magnetizable spring metal having a first portion contacting said base in one end of said member, having a second portion extending substantially perpendicular to said first portion, and a third portion extending as a cantilever beam towards the other end of said member; a filler block on said first portion having its inner end contacting said second portion; extensions on said sides bent over against said filler block for supporting same and said armature in said member; a contact member of magnetizable metal in the other end of said member, said contact member having a first portion extending substantially parallel to said base, and having a second, inner portion extending substantially perpendicular to said base and overlapping and spaced from said free end of said armature; a permanent magnet on said first portion of said contact member and having its inner end closely spaced from said free end of said armature; insulation around said magnet and said first portion of said contact member for insulating same from said channel member; other extensions on said sides bent over against said insulation for supporting same, said magnet and contact member in said channel member, and an energizing coil supported around said channel member for magnetizing said armature, said free end of said armature being adapted to strike said inner portion of said contact member, and to close an electric circuit connected thereto and to said armature when alternating current having the resonant frequency of said armature is passed through said coil.

3. A resonant switch as claimed in claim 1 in which the fixed end of the armature is anchored in the filler block, and in which another flexible reed armature of magnetizable metal spaced from said armature has one end anchored in said block.

4. A magnetic switch comprising a channeled base having *a closed side, an opposite open side, and* spaced, substantially parallel *closed* sides *extending perpendicular to said first closed side,* a flexible reed [,] armature member of magnetizable metal, means for supporting one end of said member in one end of said base, said means including extensions from said *parallel* sides bent over towards each other substantially perpendicular to said *parallel* sides, a contact member of [magnetizable] metal having one end overlapping the other end of said armature member, means for supporting the other end of said contact member in the other end of said base, said last mentioned means including extensions from said *parallel* sides bent over towards each other substantially perpendicular to said *parallel* sides, means insulating one of said members from said base, said base being of metal, and an energizing coil [supported around said base] *around said members and having its ends supported from said extensions, said members extending between said open side and said first mentioned closed side.*

HERBERT G. WEIGHTMAN.

REFERENCES CITED

The following references are of record in the file of this patent or the original patent:

UNITED STATES PATENTS

| Number | Name | Date |
|---|---|---|
| 684,378 | Potter | Oct. 8, 1901 |
| 708,539 | Fell | Sept. 9, 1902 |
| 996,713 | Hartman-Kempf | July 4, 1911 |
| 1,088,771 | Dean | Mar. 3, 1914 |
| 1,883,137 | Waller | Oct. 18, 1932 |
| 2,257,900 | Crum | Oct. 7, 1941 |
| 2,375,017 | Marrison | May 1, 1945 |
| 2,381,080 | Ray | Aug. 7, 1945 |
| 2,414,476 | Mathes | Jan. 21, 1947 |